United States Patent [19]

Lechner et al.

[11] Patent Number: 5,240,974

[45] Date of Patent: Aug. 31, 1993

[54] POLYAMIDE REINFORCED WITH SILANIZED GLASS FIBERS

[75] Inventors: Ulrike Lechner, Munich; Rudolf Kruedener, Reinheim, both of Fed. Rep. of Germany

[73] Assignee: Degussa Aktiengesellschaft, Frankfurt am Main, Fed. Rep. of Germany

[21] Appl. No.: 721,402

[22] Filed: Jun. 26, 1991

[30] Foreign Application Priority Data

Jul. 5, 1990 [DE] Fed. Rep. of Germany ....... 4021393

[51] Int. Cl.$^5$ ................................................ C08K 9/06
[52] U.S. Cl. .................... 523/214; 523/213; 524/188
[58] Field of Search ................. 523/214, 213; 524/188

[56] References Cited

U.S. PATENT DOCUMENTS

| | | | |
|---|---|---|---|
| 3,622,535 | 11/1971 | Greenley | 523/213 |
| 3,843,591 | 10/1974 | Hedrick et al. | 523/214 |
| 4,697,009 | 9/1987 | Deschler et al. | 540/487 |
| 4,891,399 | 1/1990 | Ohkawa et al. | 523/213 |

OTHER PUBLICATIONS

K. Schneider, "Ionisch Polymerisierte Lactame (Polyamide)," *Kunststoffe*, vol. 55 (1965), pp. 315–316.

H. Hemmel, "Die Aktivierte Anionische Polymerisation von Lactamen und Ihre Anwendungstechnischen Moeglichkeiten Beim Drucklosen Formguss," *Kunststoffe*, vol. 59 (1969), pp. 405–408.

*Primary Examiner*—Paul R. Michl
*Assistant Examiner*—Tae H. Yoon
*Attorney, Agent, or Firm*—Beveridge, DeGrandi & Weilacher

[57] ABSTRACT

Polyamides reinforced with glass fibers and produced by means of the activated anionic polymerization of lactams. In order to improve the adhesion between plastic and glass fibers, the surface of the glass fiber is modified with organosilicon compounds.

5 Claims, 1 Drawing Sheet

POLYAMIDE REINFORCED WITH SILANIZED GLASS FIBERS

BACKGROUND OF THE INVENTION

The invention relates to polyamide polymers reinforced with silanized glass fibers and produced by means of the activated anionic polymerization of lactams. The invention also includes the actual glass fibers themselves and methods for the production of the fibers.

Thermoplastic material is being increasingly used for the production of construction parts made from fiber-reinforced plastics. The advantage of these plastics over duroplastic material resides primarily in a greater impact resistance and in a relatively good capacity for being reworked.

For reasons of cost, primarily glass fibers in very different forms and amounts are worked in. If possible, the boundary surface bonds between the inorganic fibrous material and the organic matrix material should take place via a chemical reaction. To this end, primarily monomeric silicon compounds, such as silanes, are used as adhesive agents.

Glass fiber products treated with primary amino silanes as adhesive agents are generally available for use with polyamides. However, the use of such glass fibers treated with amino silanes is only suitable for the reinforcement of polyamides (PA) obtained by means of hydrolytic polymerization. Problems frequently occur if fibers silanized in this manner are used in PA construction parts or PA prepregs produced by means of activated anionic polymerization. On the one hand, the activated anionic polymerization of lactams is very moisture-sensitive, and on the other hand, the hydrophilic behavior of the glass filaments is increased even more by the hydrophilic amino silane. Fibers pretreated in this manner must be strictly protected from moisture during storage and processing. So much water is adsorbed on the fiber surface, even at average air moisture, that the polymerization on the fiber boundary surface takes place in an incomplete fashion. The result is that the unreacted, remaining monomer components disturb the bridge formation of the glass fiber-adhesive agent-polymer matrix. Hollow spaces then result around the fibers on account of the relatively high polymerization shrinkage or contraction, such that no strengthening effect can take place in those areas. The fibers no longer exhibit a reinforcing action, but rather a weakening action, since bubbles or shrinkage cavities form. The use of untreated or desilanized fibers does not offer any solution to this problem.

Thus, there is the problem of making an adhesive agent available which exhibits both a bridge-building action as well as a hydrophobing action.

SUMMARY OF THE INVENTION

It is one objective of this invention to produce a polyamide resin which is reinforced by glass fibers. The polyamide is produced by means of the activated anionic polymerization of lactams. The polyamide is further characterized in that the surface of the glass fibers is silanized by coating at least a part of the surface of the glass fibers with a compound selected from the group consisting of:

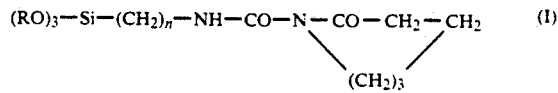

and

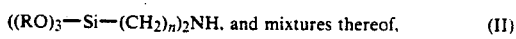

in which n represents a whole number from 2 to 6, preferably from 3 to 4, and R denotes an alkyl group with 1 to 4 carbon atoms.

The method further includes heating for a sufficient period of time to silanize the surface. The glass fibers so obtained are then mixed with the polyamide produced by the activated anionic polymerization of lactams.

The compounds according to formula I are obtained according to the method described in EP Patent 0,212,056, which is entirely incorporated herein by reference. The compounds according to formula II have been widely known for some time, and methods for making the same are conventional and deemed to be within the level of ordinary skill in the art.

The activated ionic polymerization of lactams is a method for the production of polyamides which has long been known; see, for example, K. Schneider, Kunststoffe, 55, (1965), pp. 315-316, and H. Hemmel et al., Kunststoffe, 59, (1969), pp. 405-408. Both of the above documents are entirely incorporated herein by reference.

BRIEF DESCRIPTION OF THE FIGURES

The invention will be described in conjunction with the attached Figures, wherein.

DETAILED DESCRIPTION OF THE INVENTION

Figure 1:
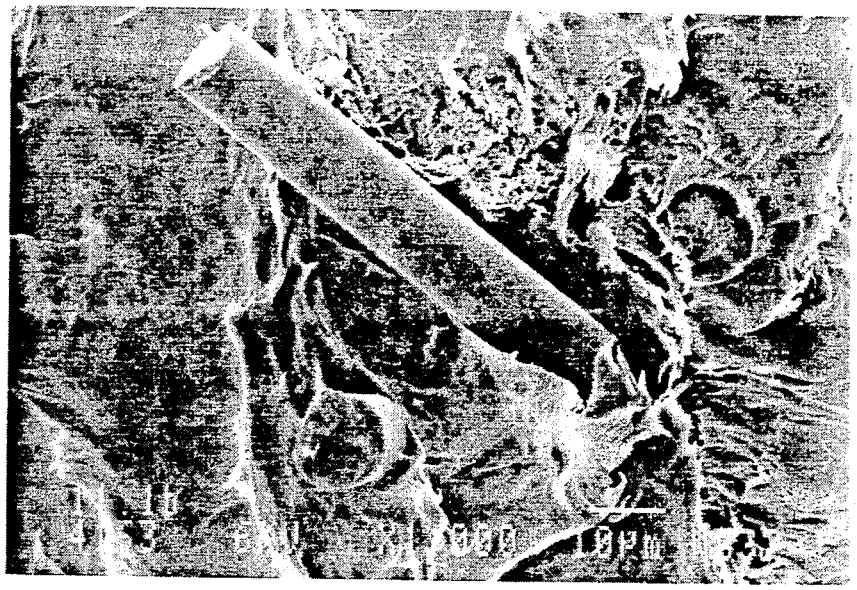
FIG. 1 is a scanning electron microscope photograph of a polyamide with glass fibers whose strength is adversely influenced by hollow spaces around the fibers.

It is preferable to proceed with the production process of the glass fibers in such a manner that the glass fibers are advantageously heated to a temperature between 110° and 150° C. The fibers are silanized by adding at least one of the compounds according to formulas I and II described above, preferably in a mixture with a lactam melt containing a suitable catalyst, to the monomeric melt containing a suitable activator and heated to the same temperature range of between 110° and 150° C.

Polymerization to produce the polyamide then takes place in the presence of the glass fibers to produce the polyamide reinforced with the glass fibers.

In order to prevent the fibers from sinking in the melt, it has proven to be advantageous to add 0.5 to 2.5% by weight, relative to the melt, of a pyrogenically produced silica (AEROSIL®, available from Degussa AG), especially a hydrophobic silica (e.g., AEROSIL® R972, available from Degussa AG), with a specific surface of 50 to 300 $m^2/g$ (measured according to BET with $N_2$) to the melt at the same time as, prior to, or in a mixture with the glass fibers.

The polymerization known from the state of the art then takes place subsequently in the presence of the alkaline catalyst, such as sodium caprolactamate, and in the presence of the activator.

Compounds from the group of the isocyanates, carbodiimides, and N-substituted cyanamides may be used as activators. Polyisocyanates and isocyanate producing compounds are especially preferred.

Another feature of the invention is constituted by the glass fibers for reinforcing polyamide produced by activated anionic polymerization. This process is characterized in that the glass fibers are modified on the surface with an organosilane of the general formulas I and/or II.

The silanized glass fibers have at least a portion of their surface silanized under heat with at least one of the compounds of the general formulas I and II.

Glass fibers modified in this manner are produced with the aid of a method for surface treatment in which the glass fibers are present, for example, in the form of fabric of long fibers or short fibers. The surface treatment method for the glass fibers includes wetting the fibers at 5° to 40° C., especially 20° to 25° C., with a solution containing 0.01 to 10% by weight, and preferably 0.01 to 1% by weight of an organosilane according to formulas I and/or II, relative to the total amount of fiber or fabric.

Suitable solvents to form this surface treating solution are polar compounds such as alcohols, especially methanol and ethanol; petroleum ether; isopropanol; crystal oils and gasoline.

The wetting of the fibers can take place by means of spraying or immersion.

After an impregnation time of 1 to 120 minutes, the moist fabric is allowed to predry, generally at temperatures between 20° to 60° C., and a tempering treatment at above 60° to 120° C. then follows, which treatment preferably lasts 0.1 to 15 hours.

Another feature of this invention is constituted by the glass fibers obtained in this manner, which generally exhibit an organosilane content of 0.01 to 10% by weight, especially 0.01 to 1.0% by weight, relative to the treated fiber.

The percentage by weight of the fibers in the reinforced polyamide is generally 30 to 60% by weight, preferably 50 to 51% by weight, relative to the sum of the polymer and the glass fiber.

It was found that the treatment of the glass fibers with the organosilanes according to formulas I and/or II in accordance with the invention, results in a distinct improvement in the adhesion between polymer and fiber.

This improvement was displayed in the course of bending and tensile tests. While not wishing to be bound by any particular theory of operation, it is believed that the improvement shown is the result of moistening of the fibers treated in accordance with the invention and in that way, they are better bound into the polymer matrix.

Scanning electron microscope photographs show the distinct difference over the known use of γ-aminopropyltriethoxysilane.

In the case of the use of γ-aminopropyltriethoxysilane, noticeable hollow spaces form around the fibers which adversely influence the strength (FIG. 1). The formation of these hollow spaces is avoided by the invention.

Figure 2:
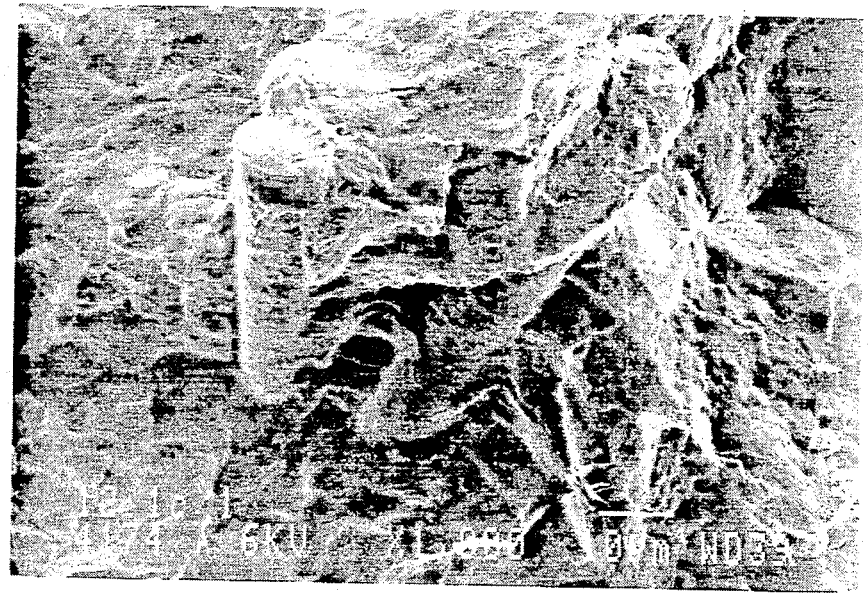
FIG. 2 is a scanning electron microscope photograph of a polyamide with glass fibers made in accordance with the invention.

As a result of the hollow spaces, the strength property of the first-named γ-aminopropyltriethoxysilane reinforced polyamides is lower than those of polyamides which are reinforced with untreated or desilanized glass fibers (FIG. 2).

EXAMPLES

Example 1

Production of the Test Specimens

An appropriate amount of caprolactam is distributed into two vessels and melted and heated to 110° to 120° C. The activator is placed into the vessel with the greater amount of the lactam and co-melted. The catalyst is placed in the other vessel and also co-melted. After silica (AEROSIL R972) and short glass fibers have been stirred into the activator melt and the melts are heated to 125° C., the melts are mixed and cast into a form heated to 150° C.

After a cooling-down time of two to three hours, the tensile test specimens can be removed from the dividable form and conditioned in accordance with the tensile test conditions.

Example for the composition of a melt:
370 g ε-caprolactam
14 g catalyst
11 g activator
5 g AEROSIL R972
120 g short glass fibers (30% by weight relative to matrix)

Substances Used a) ε-caprolactam in the form of scales or chips
b) Catalyst: Sodium caprolactamate
c) Activator: Caprolactam-N-carboxylic acid-hexamethylene diamide-1,6
d) Organosilane: Si 252, bis-(3)triethoxysilylpropyl) amine; Si 254, N-((3-triethoxysilylpropyl) (carbamoyl)) caprolactam
e) Hydrophobic silica R972 AEROSIL ® (120 m²/g)
f) Short glass fiber MF 7901 (BAYER AG) fiber length 100-300 μm, diameter 14 μm
g) Long glass fiber (roving from VETROTEX)

Test Methods a) Bending tests (DIN 53 542)
b) Tensile test (DIN 53 455)

The tests are performed on specimens which are stored dry (22° C., 63% relative moisture).

Performance of Test

Application of the silanes

A 0.5% by weight silane solution is produced in isopropanol, relative to the amount of glass fiber to be silanized.

This is followed by a 30 minute impregnation time in the solution with drying times of 60 minutes at a room temperature of 22° C. and 63% relative moisture as well as of 120 minutes in a hot-air furnace at 120° C. During the first drying phase, the silanized glass fibers are placed on blotting paper.

Test results

The test results (Table 1) show the improvement of the characteristic mechanical quantities when using the glass fibers silanized in accordance with the invention (GF) (0.5% solution) in comparison to the use of nontreated fibers.

Tests 1 to 3 were performed with a content of 30% by weight short glass fibers and tests 4 with 30% by weight long glass fibers (Roving).

TABLE 1

| Specimen | Maximum Tensile Force (N) | Tensile Strength (N/mm$_2$) | Elongation (%) |
| --- | --- | --- | --- |
| 1 GF untreated | 4157 | 68.7 | 1.41 |
| 2 GF + Si 252 | 4636 | 76.6 | 1.62 |
| 3 GF + Si 254 | 4810 | 80.3 | 1.77 |
| 4 Roving + Si 254 | 6340 | 104.6 | 1.46 |

TABLE 2

| | Percentage Improvement in the Individual Ranges | | |
| --- | --- | --- | --- |
| Specimen | Maximum Tensile Force (%) | Tensile Strength (%) | Elongation (%) |
| 1 | | | |
| 2 | 12 | 11.5 | 15 |
| 3 | 16 | 17 | 26 |
| 4 | 53 | 52 | 4 |

Various changes and modifications may be made without departing from the spirit and scope of the invention, as defined in the attached claims.

German Priority Application P 40 21 393.5, filed in Germany on Jul. 5, 1990 is relied on and entirely incorporated herein by reference.

We claim:

1. A polyamide resin which is reinforced by glass fibers, produced by the method comprising:
    silanizing a surface of said glass fibers by coating at least part of the surface of said glass fibers with a compound represented by formula (I):

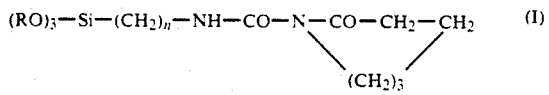

wherein n represents a whole number from 2 to 6 and R denotes an alkyl group with 1 to 4 carbon atoms, and heating for a sufficient period of time to silanize said surface and mixing said glass fibers so obtained with a polyamide produced by an activated anionic polymerization of lactams.

2. A method of producing a polyamide reinforced with silanized glass fibers, wherein a silanizing compound is used to produce silanized glass fiber, said compound being represented by formula (I):

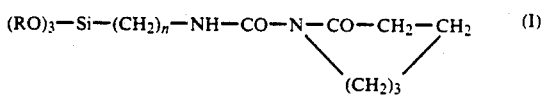

wherein n represents a whole number from 2 to 6 and R denotes an alkyl group with 1 to 4 carbon atoms, said method comprising:
    adding a catalyst and the silanized glass fibers to a lactam melt heated to 110° to 150° C., said melt containing a suitable activator, and polymerizing said lactam in the presence of said fibers to produce said polyamide reinforced with silanized glass fibers.

3. The method according to claim 2, wherein the silanized glass fibers are heated to the temperature of the melt prior to adding into said melt.

4. The method according to claim 2, further comprising adding 0.5 to 2.5% by weight of a pyrogenically produced silica to said melt.

5. A method for using a silanized compound to produce a reinforced polyamide comprising:
    providing silanized glass fibers, said glass fibers being silanized with a silanizing compound represented by formula (I):

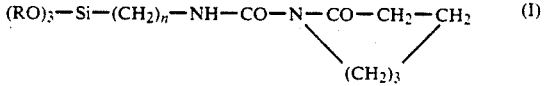

wherein n represents a whole number from 2 to 6 and R denotes an alkyl group with 1 to 4 carbon atoms, adding a catalyst and the silanized glass fibers to a lactam melt heated to 100° to 150° C., said melt containing a suitable activator, and polymerizing said lactam in the presence of said fibers to produce said reinforced polyamide.

* * * * *